United States Patent [19]

Benson et al.

[11] Patent Number: 4,576,386
[45] Date of Patent: Mar. 18, 1986

[54] ANTI-EXTRUSION BACK-UP RING ASSEMBLY

[75] Inventors: Alan M. Benson, Lawndale; John D. Mawer, Culver City; Alan V. Ruzicka, Santa Monica, all of Calif.

[73] Assignee: W. S. Shamban & Company, Santa Monica, Calif.

[21] Appl. No.: 692,354

[22] Filed: Jan. 16, 1985

[51] Int. Cl.$^4$ .......................... F16J 9/00; F16J 15/24
[52] U.S. Cl. .................... 277/165; 277/188 A
[58] Field of Search .................. 277/165, 188 A, 195, 277/198

[56] References Cited

U.S. PATENT DOCUMENTS

| | | | |
|---|---|---|---|
| 2,765,204 | 10/1956 | Josephson | 309/23 |
| 2,823,058 | 2/1958 | Ecker et al. | 288/16 |
| 3,071,386 | 1/1963 | Scannell | 277/188 |
| 3,469,853 | 9/1969 | Gullick | 277/112 |
| 3,521,893 | 7/1970 | Josephson | 277/176 |
| 3,905,608 | 9/1975 | Olsen et al. | 277/188 |
| 3,920,252 | 11/1975 | Dechavanne | 277/188 |
| 3,970,321 | 7/1976 | Dechavanne | 277/165 |
| 3,990,712 | 11/1976 | Dechavanne | 277/165 |
| 3,999,767 | 12/1976 | Sievenpiper | 277/136 |
| 4,059,280 | 11/1977 | Eastwood | 277/188 |
| 4,179,131 | 12/1979 | Nussbaumer | 277/165 |
| 4,190,259 | 2/1980 | Zitting | 277/165 |
| 4,239,244 | 12/1980 | Brent | 277/165 |
| 4,244,588 | 1/1981 | Langewisch | 277/5 |

FOREIGN PATENT DOCUMENTS 984740 3/1965 United Kingdom .

Primary Examiner—Robert I. Smith
Attorney, Agent, or Firm—Poms, Smith, Lande & Rose

[57] ABSTRACT

A seal back-up assembly adapted for use in preventing the extrusion of the cap seal of an elastomer energized seal into the extrusion gap between two mating surfaces which are being sealed by the elastomer energized seal. One of the mating surfaces has a groove with side walls in which the elastomer energized seal is housed. The elastomer energized seal includes a cap seal and an elastomer energizer. The seal back-up assembly includes first and second back-up elements, which are located between the elastomer energized seal and the groove walls to sandwich the elastomer energized seal therebetween. Each of the back-up elements includes an outer member made from a relatively hard, non-resilient material which is sufficiently strong to prevent extrusion of the cap seal and an inner member made from a relatively soft plastic material which does not abrade or chafe the soft elastomer energizer. The outer member and inner member include mating perimeter surfaces which locate the two members together so that the outer member is positioned next to and adjacent against the cap seal portion of the elastomer energized seal, but does not contact the elastomer energizer, while the inner member is positioned against the expander element and partially overlapping the cap seal.

21 Claims, 8 Drawing Figures

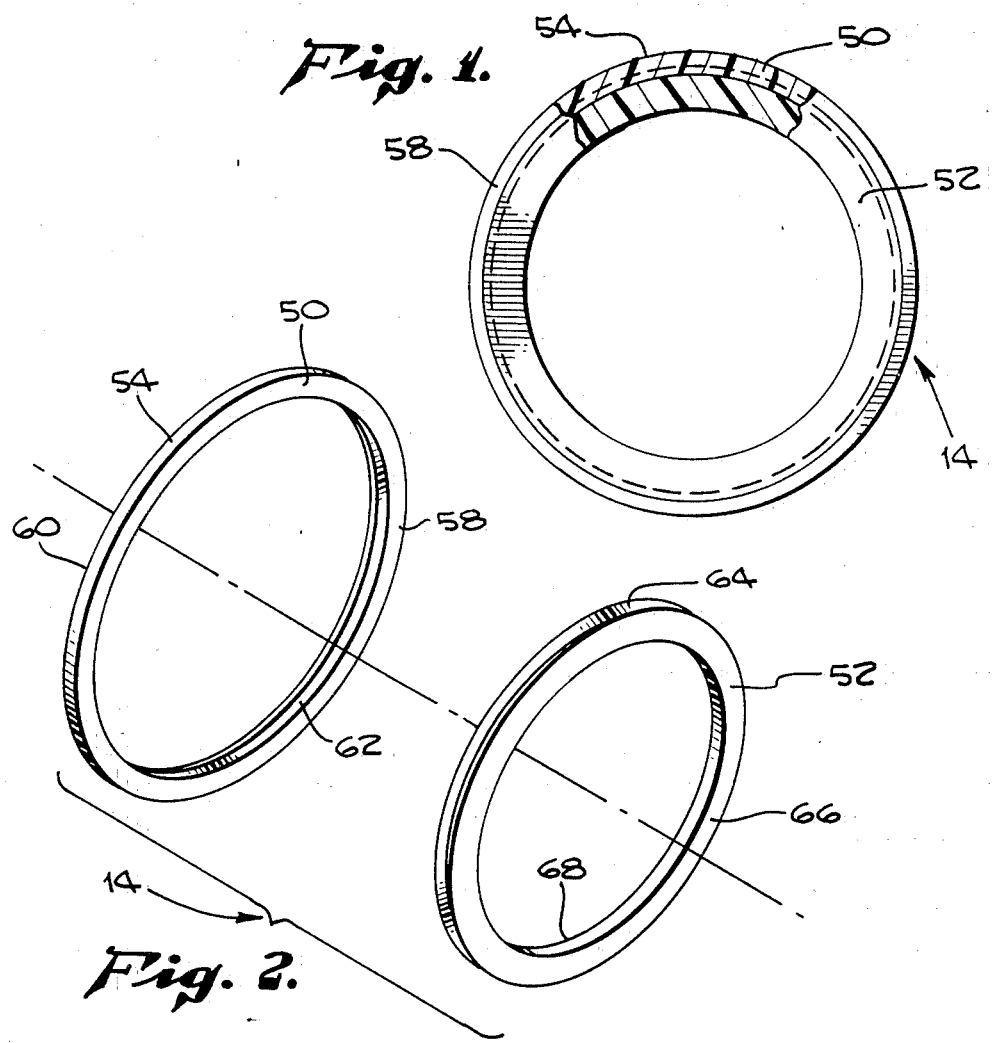
Fig. 1.
Fig. 2.
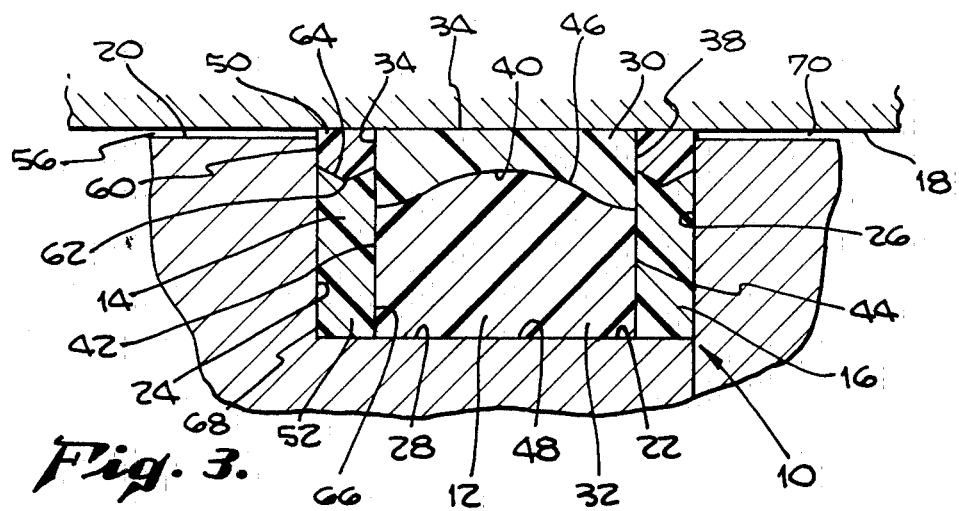
Fig. 3.

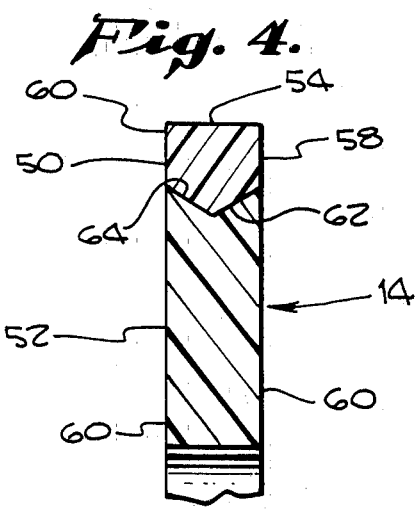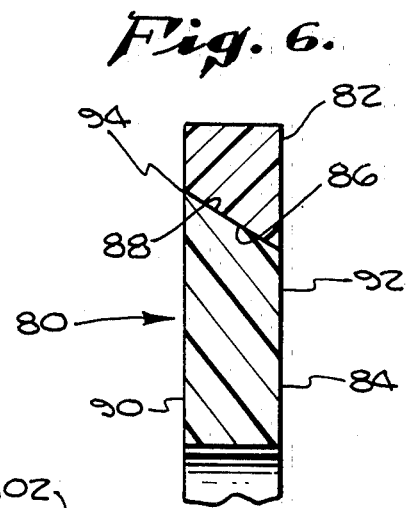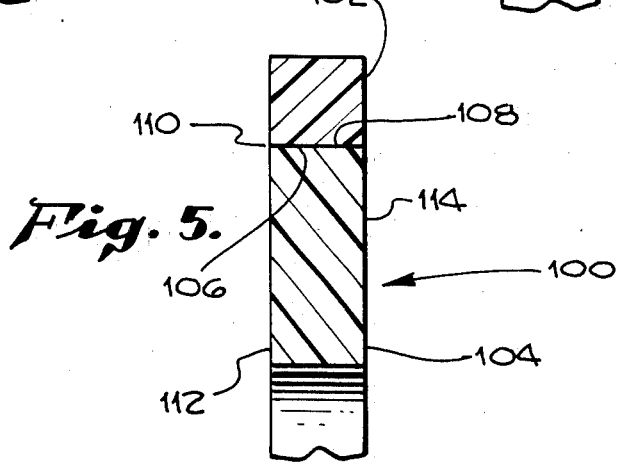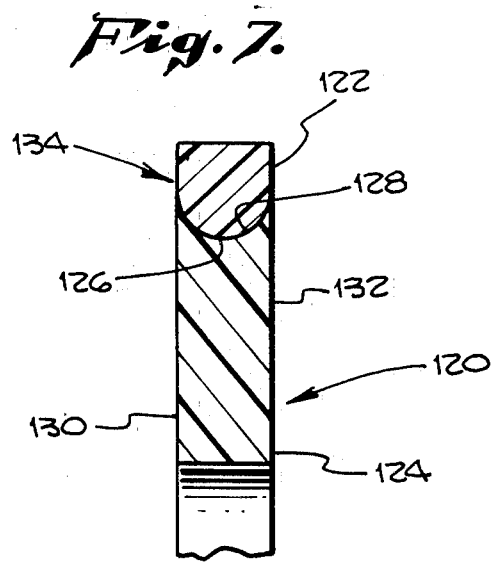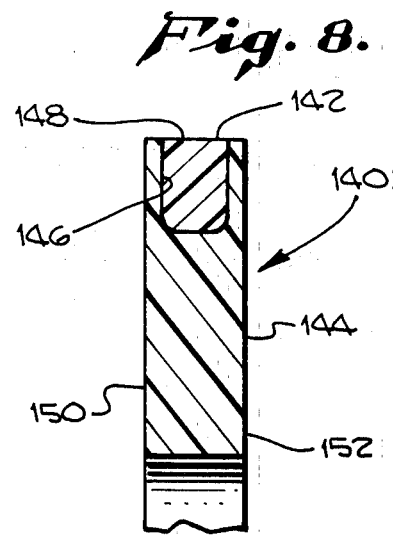

ANTI-EXTRUSION BACK-UP RING ASSEMBLY

BACKGROUND OF THE INVENTION

The present invention relates generally to elastomer energized seals for use in high pressure applications. More praticularly, the present invention relates to an improved back-up ring assembly for use with such elastomer energized seals to prevent deformation and extrusion of the cap seal of the seal assembly during operation at high pressures.

Elastomer energized seals are commonly used to provide a seal between various mating surfaces found in a wide variety of mechanical devices. Elastomer energized seals are used widely in hydraulic devices such as landing gear struts, hydraulic power tools, hydraulic actuators and a wide variety of other mechanical devices including internal combustion engines, vacuum pumps, etc.

The most common type of elastomer energized seal is the O-ring type seal which is used in piston or rod sealing applications to provide a seal between two adjacent cylindrical surfaces. The elastomer energized seal is mounted within a groove in one of the surfaces and extends annularly across the gap between the two surfaces for sealing against the other surface. The elastomer energized seal is a two piece seal which typically includes a plastic cap seal or sealing ring which is energized against the mating or sealing surface by an elastomer expander ring. Expander rings are usually made from an elastic material such as rubber or synthetic equivalents having elastic properties similar to rubber. The cap seal is typically made from a low surface tension plastic such as polytetrafluoroethylene (PTFE) or soft metal.

During high pressure applications, i.e., 3,000 pounds per square inch gage and over, the cap seal of the seal assembly tends to deform and become gradually extruded into a gap between the adjacent surfaces. This gap is commonly known as the extrusion gap. Problems with extrusion of the gap seal are particularly severe during high pressure or vacuum applications. This is especially troublesome when reciprocating surfaces are being sealed for piston-cylinder or rod-bore sealing systems.

In order to prevent or at least reduce extrusion of the cap seal into the extrusion gap, various back-up or anti-extrusion rings have been developed which are positioned on either side of the elastomer energized seal assembly. The back-up rings are typically one piece rings which are made from a relatively hard material having a high modulus of elasticity. The back-up rings have conventionally been designed to abut against both the cap seal ring and the elastomer energizer ring.

Although back-up rings made from relatively hard materials are effective in preventing extrusion of the cap seal into the extrusion gap, problems have been experienced with the elastomer energizer being abraded or chafed by contact with the back-up ring. The use of softer back-up ring materials in order to reduce chafing of the elastomer energizer is not possible because the softer materials are not effective in preventing extrusion of the cap seal.

It would be desirable to provide a back-up ring which provides adequate protection against cap seal extrusion at high pressures or high vacuums, while providing protection for the elastomer energizer ring against abrasion.

SUMMARY OF THE INVENTION

In accordance with the present invention, a seal system is provided in which an improved back-up or anti-extrusion ring assembly is provided which prevents extrusion of the cap seal of the elastomer energized seal during high pressure operation while at the same time reducing or eliminating abrasion of the elastomer portion of the energized seal assembly.

The present invention is based upon a back-up ring assembly which is designed for use in preventing the extrusion of the cap seal of an elastomer energized seal assembly into the extrusion gap between the two mating surfaces being sealed by the elastomer energized seal. The elastomer energized seal is positioned in a groove present in one of the mating surfaces. The cap seal is made from a relatively hard, non-resilient seal material with the cap seal having a sealing surface for contact with the surface opposite the groove in which the seal is mounted. The cap seal also has first and second edges and a supporting surface.

In addition to the cap seal, the elastomer energized seal also includes a resilient expander or energizing element made from a relatively soft elastomer which is located below the cap seal in the groove and contacts the cap seal supporting surface to bias the cap seal into sealing engagement with the mating surface opposite the groove in which the seal is mounted. The expander element also includes first and second edges.

In accordance with the present invention, a back-up assembly is provided which includes a first back-up ring located in the groove adjacent the first edges of the cap seal and expander element, with a second back-up ring located in the groove adjacent the second edges of the cap seal and expander element. This provides a seal assembly in which the elastomer energized seal is sandwiched between two back-up rings.

The back-up rings each include an outer member made from a relatively hard, non-resilient material which is sufficiently strong to prevent extrusion of the cap seal. The outer member includes a first edge adapted to be positioned next to and adjacent against the edge of the cap seal and a second edge adapted to be positioned against the groove side wall. As an important feature of the present invention, the back-up ring is designed so that the outer member does not contact the relatively soft expander element.

The back-up rings each also include an inner member which is made from a material which is softer than the outer member. The inner member includes a first edge adapted to be positioned next to and adjacent against the edge of the expander element and a second edge adapted to be positioned against the groove side wall. The inner member is made from a material which is sufficiently soft to prevent abrasion or chafing of the expander element. The inner member is designed so that only the first edge of the inner member contacts the expander element. Means are provided for connecting the inner members of the back-up rings to the outer members to provide back-up rings on opposite sides of the elastomer energized seal to prevent extrusion of the cap seal during high pressure operations.

As a particular feature of the present invention, the double member construction of the back-up rings in which the outer member is made from relatively hard durable material and inner member is made from relatively soft material provides an especially durable system in which wear and abrasion of the elastomer energized seal is reduced. Although back-up elements made from a single relatively hard, non-resilient seal material might provide adequate anti-extrusion protection, such single element back-up rings would be expected to cause excessive wear and abrasion of the soft elastomer portion of the seal assembly. The reduced wear and compatibility of the multi-member back-up rings in accordance with the present invention provide a reduced wear system which increases the life expectancy of the elastomer energized seal to thereby increase the times between equipment tear down and overhaul. Such increased durability of the elastomer energized seal and the resultant increase in times between repair and replacement is especially important in large complex hydraulic equipment where replacement and overhaul of these seals can be a time consuming and expensive operation.

The above-discussed and many other features and attendant advantages of the present invention will become apparent as the invention becomes better understood by reference to the following detailed description when considered in conjunction with the accompanying drawings.

BRIEF DESCRIPTION OF THE DRAWINGS

FIG. 1 is a side view of an exemplary preferred seal back-up element, in accordance with the present invention.

FIG. 2 is a perspective view of a disassembled seal back-up element.

FIG. 3 is a sectional view showing an elastomer energized seal which is sandwiched between the seal back-up assembly in accordance with the present invention.

FIG. 4 is an enlarged sectional view of the back-up ring 14 shown in FIG. 3.

FIG. 5 is a sectional view of an alternate preferred embodiment in accordance with the present invention.

FIG. 6 is a sectional view of another alternate preferred embodiment in accordance with the present invention.

FIG. 7 is a sectional view of another alternate preferred embodiment in accordance with the resent invention.

FIG. 8 is a sectional view of another alternate preferred embodiment in accordance with the present invention, which could be used with an O-ring.

DETAILED DESCRIPTION OF THE INVENTION

An elastomer energized seal assembly which incorporates a seal back-up assembly in accordance with the present invention is shown generally at 10 in FIG. 3. The seal assembly 10 includes the elastomer energized seal 12, a first back-up ring 14 and a second back-up ring 16. The seal assembly is adapted for use in providing a seal between two mating surfaces such as cylinder wall 18 and piston wall 20. The seal assembly 10 can be used for a wide variety of applications where a seal is desired between two mating surfaces. The seal assembly is especially well suited for use in high pressure environments where pressures of 3,000 psig and greater are present. The seal assembly is especially well suited for use in high pressure hydraulic equipment, high performance vacuum and compressor systems and high pressure systems in general where stationary, oscillatory, rotary or reciprocating surfaces must be sealed.

The seal assembly 10 is mounted in a groove 22 in piston wall 20. The groove 22 includes side walls 24 and 26 and bottom 28. The elastomer energized seal 12 includes a cap seal 30 and expander element 32. The cap seal 30 has a sealing surface 34 for sealing contact with cylinder wall 18. The cap seal 30 further includes a first edge 36, second edge 38 and a support surface 40. The cap seal is made from any of the well known, relatively hard, non-resilient seal materials which are commonly used in elastomer energized seals. These materials include polytetrafluoroethylene (PTFE), and other plastics such as polyether etherkeytone, poly(amide-imide), polyether sulfone and other plastic hi-modulus materials having properties similar to the previously described plastics. As previously mentioned, a problem with PTFE and other similar cap seal materials is that they tend to flow under continual application of high pressures and as a result are extruded into the extrusion gaps 56 and 70.

The expander element 32 is located below the cap seal 30 in groove 22 and is designed to contact the supporting surface on the cap seal 40 to bias the cap seal 30 into sealing engagement with cylinder wall 18. The expander element 32 includes a first edge 42, second edge 44, top surface 46 and bottom surface 48. The expander element top surface 46 and cap seal support surface 40 are preferably shaped to provide a adjacent fit engagement between the cap seal 30 and expander element 32. The particular adjacent-fit configuration shown in FIG. 3 is preferred; however, any other suitable adjacent-fit arrangement may be utilized so long as suitable support for the cap seal 30 is provided by the expander element 32 to provide the desired biasing of cap seal 30 against cylinder wall 18. The expander element may be made from any of the relatively soft, resilient materials commonly used in elastomer energized seals. Natural or synthetic rubber materials, along with other synthetic elastomers which have elastic properties equivalent to natural rubber may be used.

In accordance with the present invention, the first back-up ring 14 is located in groove 22 adjacent the cap seal and expander element first edges 36 and 42. The second back-up ring 16 is located in groove 22 adjacent the second edges of the cap seal and expander element 38 and 44. A side view of first back-up ring 14 is shown in FIG. 1 with an exploded view of back-up ring 14 being shown in FIG. 2. The second back-up ring 16 is preferably identical to back-up ring 14 in both design and materials. However, it may be desirable in certain situations where different pressures are present on different sides of the seal assembly to vary the size or shape of the two back-up rings and to vary the materials from which they are made. For example, in certain applications where higher pressures are present adjacent the first back-up ring 14, it may be desirable to make the back-up ring 14 thicker than back-up ring 16. It may also be desirable to make one of the back-up rings from a harder or more durable material than the other. The following description of the back-up ring will apply equally to both rings 14 and 16, even though the description will be limited to ring 14 only.

As shown in FIGS. 1, 2 and 4, back-up ring 14 includes an outer member 50 and an inner member 52. The outer member 50 includes an outer surface 54, adapted to contact cylinder wall 18 prevent extrusion of the cap seal 30 into the extrusion gap 56 between cylinder wall 18 and piston wall 20 (see FIG. 3). The outer member 50 further includes a first edge 58 and a second edge 60. The outer member 50 further includes a convex surface 62 on the inner perimeter of the outer member 50 which is designed for adjacent-fit engagement with the concave outer surface 64 on inner member 52. Preferably, the concave and convex surfaces are chevron shaped to provide a adjacent-fit engagement as best shown in FIG. 3.

The inner member 52 includes a first edge 66 which is adapted to be positioned next to and adjacent against the expander element first edge 42. The inner member 52 also includes a second edge 68 which is adapted to be positioned to and adjacent against the groove side wall 24.

As best shown in FIG. 3, the outer member 50 and inner member 52 are designed so that the outer member 50 fits adjacent against the cap seal first edge 36, while the inner member 52 fits adjacent against the expander element first edge 42. An important feature of the present invention is that the outer member 50 be radially thin enough or otherwise designed so that it does not contact the expander element 32. As shown in FIG. 3, the outer member 50 is radially thinner than the cap seal 30 so that inner member 52 overlaps the caps seal 30 and prevents contact between the outer member 50 and expander element 32. Abrasion and chafing of the relatively soft expander element 32 is avoided by preventing contact between outer member 50 and expander element 32.

As will be described below, the outer member is made from a relatively hard, non-resilient seal material which is sufficiently resistant to flow or creep at high pressures, high temperatures, and hostile medias to prevent extrusion of the cap seal 30 into extrusion gaps 56 and 70. While the inner member 52 is made from a relatively soft plastic material which is sufficiently soft and pliable to prevent abrasion or chafing of the expander element 32. This particular feature of the present invention in which the back-up ring has a hard outer portion and a soft inner portion is advantageous in reducing excessive wear which occurs when a single member back-up element is utilized to prevent extrusion of the cap seal into gap 56 or 70.

Preferably, the outer member 50 will be made from a relatively hard, non-resilient seal material which has a higher modulus of elasticity than the cap seal material. Suitable plastics which can be used for the outer member 50 include polyimides such as products marketed under the trade name Vespel by E. I. DuPont and under the trade name Meldrin by Dixon Corporation. The Polyimides may be filled with various fiber materials such as graphite or molybdenum disulfide, if desired, to provide increased creep and wear resistance. Other synthetic plastics having properties similar to the polyimides may also be used so long as they provide a suitably strong outer member 50 which is resistant to deformation at high pressures and high temperatures to thereby prevent extrusion of the cap seal 30 into gaps 56 and/or 70.

The inner member 52 is preferably made from an plastic material which is softer than outer member 50 and which is sufficiently resilient and soft to not abrade or chafe the expander element 32. The plastic material must also be sufficiently resilient to provide adequate positioning and support of outer element 50 in contact with cylinder wall 18 to prevent extrusion of cap seal 30 into gaps 56 and 70. Preferably, the inner member 52 will be made from any suitable plastic so long as it provides adequate support and biasing of the outer member 50 while being sufficiently soft to prevent excessive wear of the expander element 32. Suitable materials for use as the inner member 52 include virgin PTFE and slightly filled PTFE and other natural or synthetic materials having similar properties.

Alternate embodiments of preferred exemplary backup rings in accordance with the present invention are shown in FIGS. 5–8. The backup ring shown generally at 80 in FIG. 6 includes outer member 82 and inner member 84. The outer member 82 includes an inclined mating surface 86 for mating contact with a corresponding inclined mating surface 88 on the inner member 84. The back-up ring 80 includes a first side 90 which is designed to be positioned next to the cap seal and elastomer energizer. The back-up ring 80 also includes a second edge 92 which is designed to abut against the side wall of the groove in which the seal is housed. An important feature in the construction of back-up ring 80 is that the outer element 82 be sufficiently radially thin so that the point 94 at which it meets inner member 84 is adjacent the cap seal to thereby prevent contact of outer element 82 with the elastomer energizer.

The alternate back-up ring shown generally at 100 in FIG. 5 also includes an outer element 102 and an inner element 104. The outer element 102 includes a flat mating surface 106 which seats upon flat support surface 108 present on the inner element 104. And, it is important that the outer element 102 be radially thin enough so that point 110 at which the outer element 102 contacts inner element 104 is adjacent the cap seal. The back-up ring 100 can be mounted so that either edge 112 or 114 is in contact with the seal assembly.

The alternate back-up ring embodiment shown generally at 120 in FIG. 7 includes outer element 122 and inner element 124. The outer element 122 includes an inner convex surface 126 which is matingly supported by concave surface 128 of inner element 124. The back-up ring 120 may be mounted adjacent the seal assembly so that either edge 130 or 132 is positioned against seal assembly. In addition, as previously mentioned, the point 134 at which the outer element 122 is exposed along edge 130 or 132 must be adjacent the cap seal so as to prevent contact of outer element 122 with the elastomer energizer.

The alternate embodiment shown generally at 140 in FIG. 8 includes an outer element 142 and and inner element 144. The inner element 144 includes a circumferential channel 146 in which the outer element 142 is housed. This particular design is preferred since the outer element 142 is completely surrounded by the softer inner element 144 except along the surface 148 where outer element 142 contacts the cylinder or other surface being sealed. The configuration shown in FIG. 8 is particularly preferred since any possibility of contact between the outer element 142 and the elastomer energizer is prevented. The back-up ring shown in FIG. 8 may be mounted so that either edge 150 or 152 butts against the elastomer energizer. The alternate back-up rings shown in FIGS. 5–8 are made from the same materials used for the outer and inner elements of the back-up rings shown in FIGS. 1–4.

Having thus described exemplary embodiments of the present invention, it should be noted by those skilled in the art that the within disclosures are exemplary only and that various other alternatives, adaptations and modifications may be made within the scope of the present invention. For example, a seal assembly utilizing a single back-up ring is possible and solid or split rings may be used with the solid ring being mounted in a split gland. Accordingly, the present invention is not limited to the specific embodiments as illustrated herein, but is only limited by the following claims.

What is claimed is:

1. A seal back-up assembly adapted for use in preventing the extrusion of the cap seal of an elastomer energized seal between two mating surfaces being sealed by said elastomer energized seal, one of said surfaces having a groove with sidewalls in which said elastomer energized seal is housed for sealing contact with the other surface, said cap seal including a sealing surface for sealing contact with said other surface, first and second edges and a supporting surface, said elastomer energized seal further including a resilient expander element located below said cap seal in said groove and in contact with said supporting surface of said cap seal to bias said cap seal into sealing engagement with said other surface, said expander element including first and second edges, said seal back-up assembly comprising:
 a first back-up ring located in said groove adjacent said cap seal first edge and a second back-up ring located in said groove adjacent said cap seal second edge, wherein each of said back-up rings includes:
 an outer member made from a relatively hard, nonresilient material which is sufficiently strong to prevent extrusion of said cap seal;
 an inner member made from a relatively soft elastic material which is sufficiently soft to prevent abrasion of said expander element; and
 means for connecting said inner member to said outer member so that said outer member is prevented from contacting said expander element to provide said back-up ring for use in preventing the extrusion of said elastomer energized seal between the two mating surfaces being sealed.

2. A seal back-up assembly according to claim 1 wherein said outer member includes a first edge adapted to be positioned next to and adjacent against the edge of said cap seal and a second edge adapted to be positioned against the groove side wall, and wherein said inner member includes a first edge adapted to be postioned next to and adjacent against the edge of said expander element and a second edge adapted to be positioned against the groove side wall.

3. A seal back-up assembly according to claim 1 wherein said cap seal is made from a plastic such as polytetrafluorethylene or other plastic used for sealing.

4. A seal back-up assembly according to claim 3 wherein said outer member is made from a polyimide, polyether etherkeytone, poly(amide-imide), polyether sulfone or other hi-modulus materials.

5. A seal back-up assembly according to claim 3 wherein said expander element is made from natural rubber, synthetic rubber or synthetic elastomer equivalents having elastic properties similar to natural or synthetic rubber.

6. A seal back-up assembly according to claim 5 wherein said inner member is made from virgin PTFE or filed PTFE.

7. A seal back-up ring according to claim 2 wherein said means for connecting said inner ring member to said outer ring member includes a convex surface on the inner perimeter of said outer ring member and a concave surface on the outer perimeter of said inner ring member, said convex and concave surfaces being shaped for mating adjacent fit engagement of said outer and inner ring members.

8. A seal back-up ring according to claim 2 wherein said convex surface and concave surface of said outer and inner elements are chevron shaped.

9. A seal back-up ring according to claim 2 wherein said means for connecting said inner ring member to said outer ring member includes a flat surface on the inner perimeter of said outer ring member and a flat surface on the outer perimeter of said inner ring member, for mating engagement of said outer and inner ring members.

10. A seal back-up ring according to claim 2 wherein said means for connecting said inner ring member to said outer ring member includes an inclined surface on the inner perimeter of said outer ring member and an inclined surface on the outer perimeter of said inner ring member, said inclined surfaces being shaped for mating engagement of said outer and inner ring members.

11. A seal back-up ring according to claim 2 wherein said means for connecting said inner ring member to said outer ring member includes a surface defining a groove extending around the outer perimeter of said inner ring member, said groove being designed to matingly receive said outer ring member.

12. An elastomer energized seal assembly adapted for providing a seal between two mating surfaces, one of said surfaces having a groove with side walls in which said elastomer energized seal assembly is housed for sealing contact with the other surface, said elastomer energized seal assembly comprising:
 a central elastomer energized seal including a cap seal, said cap seal having a sealing surface for sealing contact with said other surface, first and second edges and a supporting surface, said central elastomer energized seal further including a resilient expander element located below said cap seal in said groove and in contact with said supporting surface of said cap seal to bias said cap seal into sealing engagement with said other surface;
 a frist back-up element located in said groove adjacent said cap seal first edge;
 a second back-up element located in said groove adjacent said cap seal second edge wherein each of said back-up elements includes:
 an outer member made from a relatively hard, non-resilient seal material which is sufficiently strong to prevent extrusion of said cap seal, said outer member having a first edge adapted to be positioned next to and adjacent against the edge of said cap seal but not against said expander element, and a second edge adapted to be positioned against the groove side wall;
 an inner member made from a relatively soft material which is sufficiently soft to prevent abrasion of said expander element, said inner member having a first edge adapted to be positioned next to and adjacent against the edge of said expander element and overlapping said cap seal and a second edge adapted to be positioned against the groove side wall; and
 means for connecting said inner member to said outer member to provide said back-up element which is adapted to prevent the extrusion of the cap seal of said central elastomer energized seal in between the two mating surfaces being sealed while preventing abrasion of said expander element.

13. An elastomer energized seal assembly according to claim 12 wherein said central elastometer energized seal is a ring seal and wherein said first and second back-up elements are ring elements adapted to mate against said elastomer energized ring seal.

14. An elastomer energized seal assembly according to claim 12 for providing a seal in one direction only wherein said seal assembly includes only one back-up element.

15. An elastomer energized seal assembly according to claim 12 wherein said cap seal is made from polytetrafluorethylene and said outer member of said back-up element is made from a material which is harder and more resistant to creep than the material from which said cap seal is made.

16. An elastomer energized seal assembly according to claim 15 wherein said expander element is made from natural rubber, synthetic rubber or synthetic elastomer equivalents having elastic properties similar to natural or synthetic rubber.

17. An elastomer energized seal assembly according to claim 13 wherein said means for connecting said inner ring member to said outer ring member includes a convex surface on the inner perimeter of said outer ring member and a concave surface on the outer perimeter of said inner ring member, said convex and concave surfaces being shaped for mating adjacent fit engagement of said outer and inner ring members.

18. An elastomer energized seal assembly according to claim 13 wherein said convex surface and concave surface of said outer and inner elements are chevron shaped.

19. A seal back-up assembly according to claim 1 wherein outer member and inner member are bonded together.

20. An elastomer energized seal assembly according to claim 13 wherein the pressure present in the space between the two mating surfaces is about 3,000 psig or greater.

21. An elastomer energized seal assembly according to claim 16 wherein said outer member is made from a polyamide and said inner member is made from PTFE.

* * * * *